April 29, 1941.  L. W. KRITZER  2,239,751
HYDRAULIC BRAKE SYSTEM
Filed March 14, 1938  3 Sheets-Sheet 1
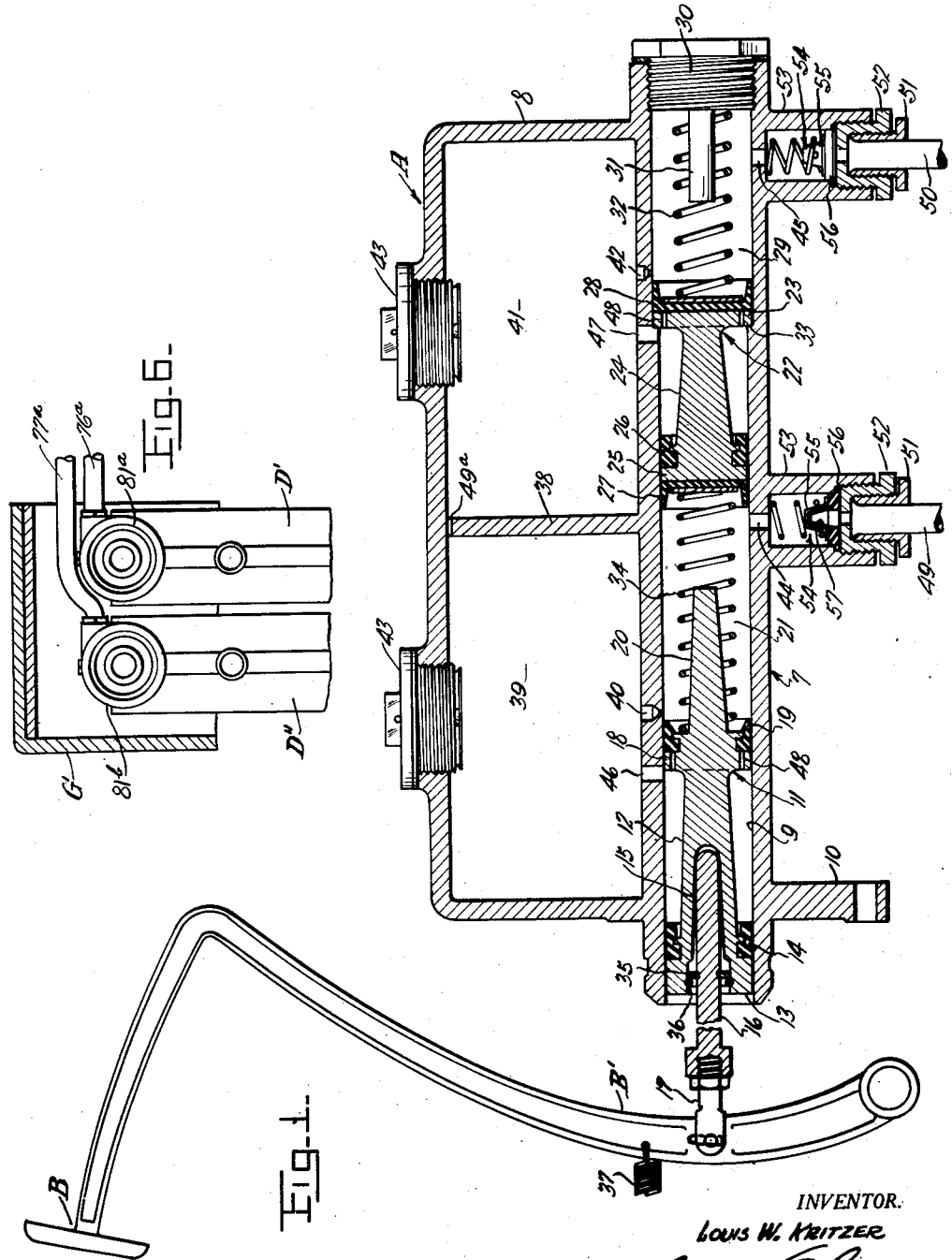
INVENTOR.
LOUIS W. KRITZER
BY Andrew E. Carlsen
ATTORNEY.

April 29, 1941. L. W. KRITZER 2,239,751
HYDRAULIC BRAKE SYSTEM
Filed March 14, 1938 3 Sheets-Sheet 2
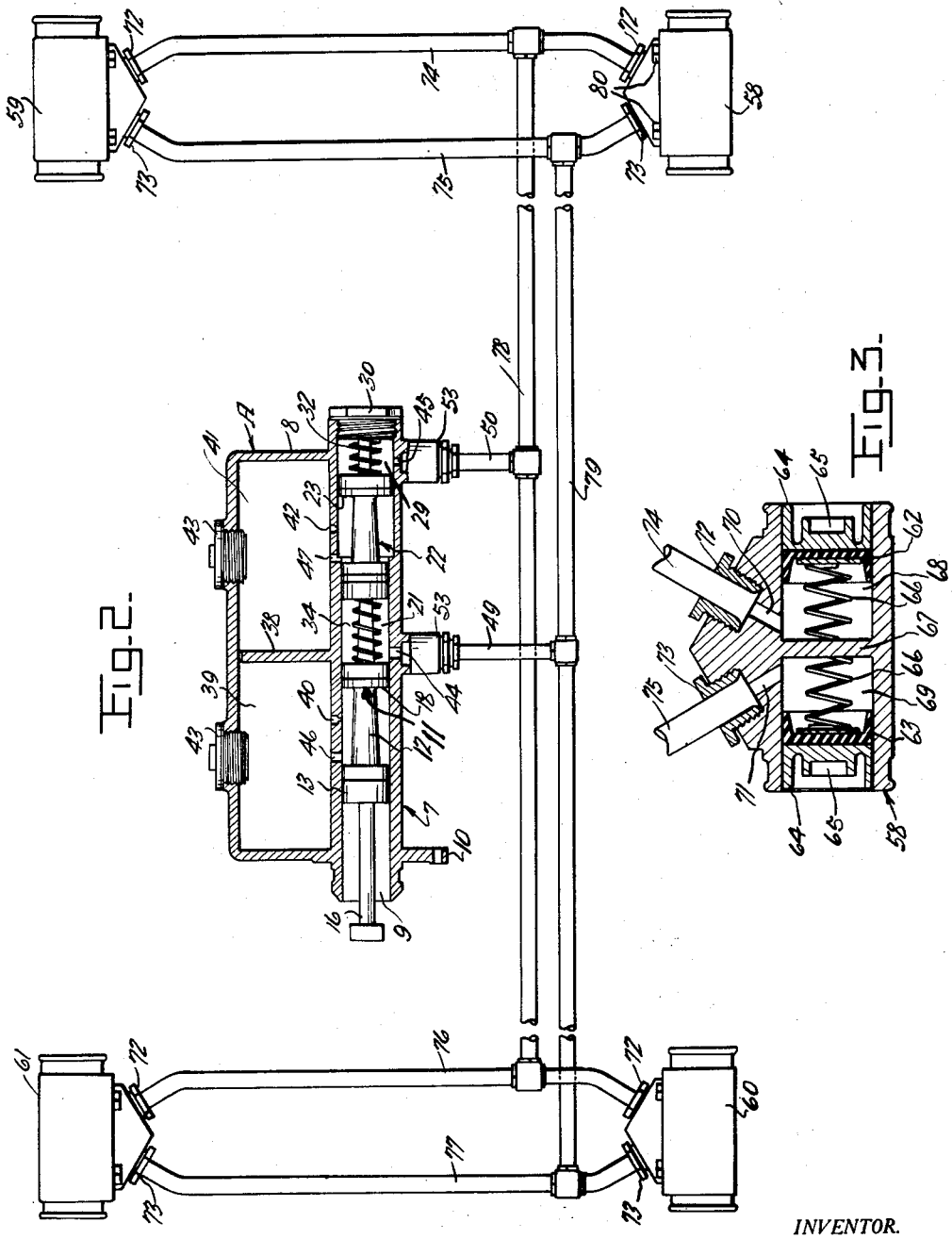
INVENTOR.
Louis W. Kritzer
BY
ATTORNEY.

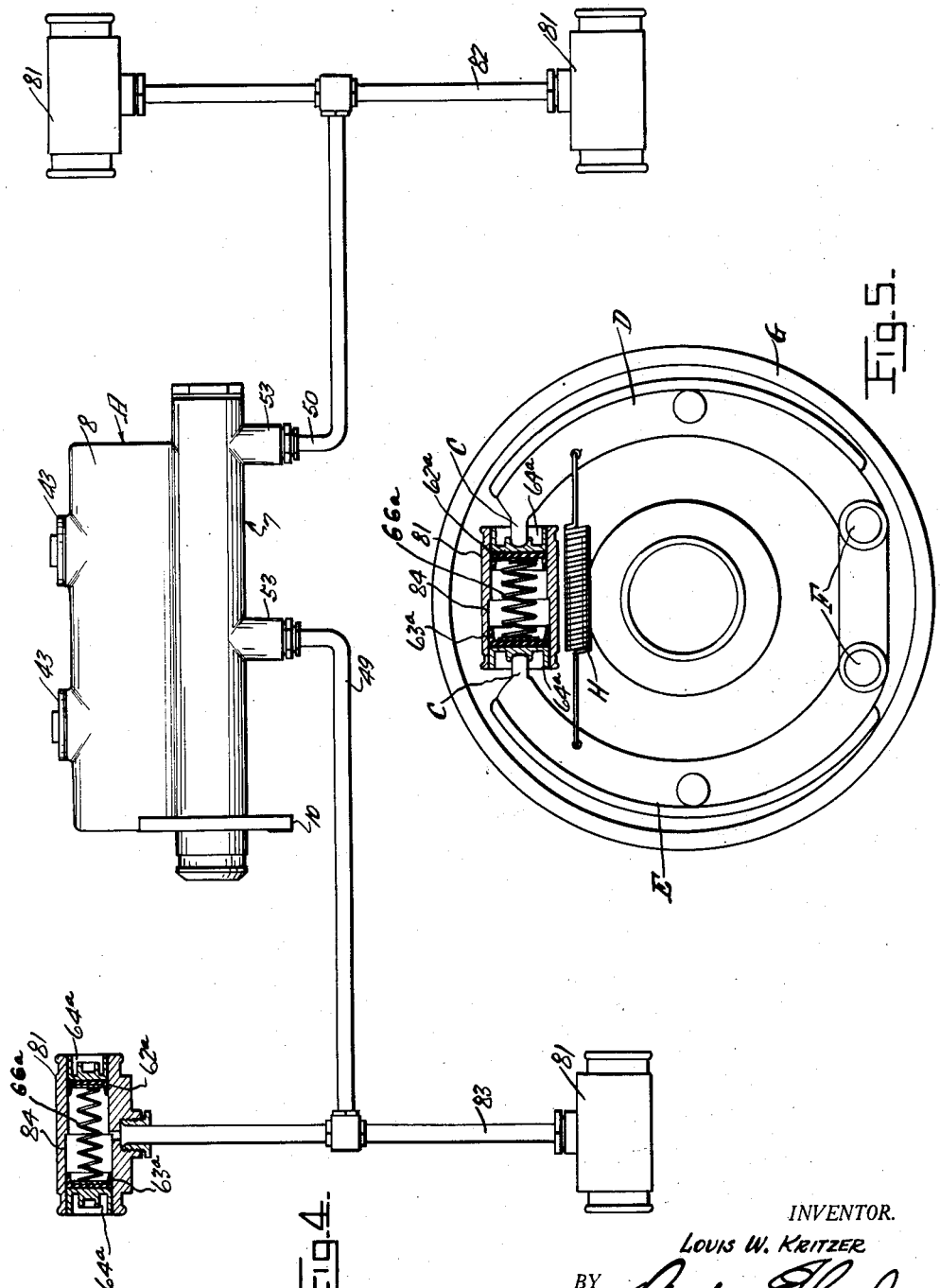

Patented Apr. 29, 1941

2,239,751

UNITED STATES PATENT OFFICE 2,239,751

HYDRAULIC BRAKE SYSTEM

Louis W. Kritzer, Minneapolis, Minn.

Application March 14, 1938, Serial No. 195,750

3 Claims. (Cl. 60—54.5)

My invention relates to improvements in hydraulic brakes for vehicles of all kinds.

It is a well known fact that the hydraulic brakes as now so much used, while having the advantages of inherent equalization of brake pressure to all wheels and convenience and smoothness in operation, also have one very great disadvantage in that a leak at any part of the entire system will render the brakes wholly inoperative. The results of such failure are often disastrous and in the effort to provide auxiliary or emergency braking to enable the vehicle to be brought to a stop when the hydraulic brakes fail mechanical brakes are generally employed. However, these brakes are apt to be ineffective for many reasons when they are most needed and, in any event, their application requires the operation of an auxiliary control of some kind with, in many instances, a resulting loss in time of applying the brakes. With these facts in mind it is the primary object of my invention to provide a hydraulic brake assembly in which the entire assembly is made up of several independent systems or circuits all normally operating together but so arranged that, should a leak or failure occur in any one part of the system, the remaining parts of the system would maintain their effectiveness and serve to bring the vehicle to a stop without auxiliary apparatus or operations of any kind.

Another object of my invention is to provide for this purpose an improved form of master cylinder assembly which includes a plurality of pressure chambers and pistons preferably arranged in tandem, for simultaneous operation by the brake pedal and so arranged that separate fluid lines may be led off to the brakes, so that a failure occurring in any one part of the system will not affect in the remaining parts the braking effectiveness of which will be maintained at all times. Another object is to provide an improved dual brake assembly for use in combination with the improved master cylinder and which includes separate brake actuating chambers and pistons for each brake shoe of each wheel and with separate connections to the several chambers in the master cylinder. A further object is to provide a brake cylinder assembly of this kind in which the proper apportionment and distribution of fluid pressures as between and to the separate brake shoes of each wheel may be provided for at the master brake cylinder itself rather than, as at present, at the brakes. A further object is to provide a brake assembly having the desirable safety features herein set forth and which is readily adaptable to vehicles of all kinds and having any number of wheels and which, in a simplified form at least, may be applied to the brake assemblies as now in use by simply replacing the conventional master cylinder with my multiple cylinder and properly connecting the brake lines thereto.

The foregoing and other more detailed objects of my invention will best be understood from the following specification, taken in connection with the accompanying drawings wherein:

Figure 1 is a vertical, longitudinal section through one form of my improved master cylinder, showing the connection of the brake pedal thereto.

Figure 2 is a diagrammatic plan view of the brake operating cylinders of a four wheel brake assembly, showing the lines or tubing connections to the master cylinder and showing the master cylinder in section.

Figure 3 is an enlarged longitudinal and diametrical section through one of the brake operating cylinders shown in Figure 2.

Figure 4 is a view similar to Figure 2, but showing a simplified arrangement of the assembly and showing one brake operating cylinder in diametrical section and the master cylinder in side elevation.

Figure 5 is an elevation of a brake drum and shoe assembly showing, in diametrical section, one of the brake operating cylinders of Figure 4 in connection with the brake shoes.

Figure 6 is an enlarged fragmental radial cross section through a brake drum showing dual brake operating cylinders in use for operating a pair of brake shoes.

In carrying out my invention I provide the master cylinder assembly shown at A comprising the elongated cylindrical body member 7 and the integral supply tank portion 8. The bore 9 extends entirely through the body member 7. A mounting flange 10 is provided by which the entire unit may be mounted on the vehicle convenient to the usual brake pedal B.

The master cylinder assembly as herein shown and described is a dual unit and in reality comprises two separate pistons and cylinders. The rear or primary piston 11 has the rearwardly extending shank 12 provided at its rear extremity with an annular tail block 13 and rubber sealing ring 14 fitting the bore 9 to provide a bearing and seal at that point. This shank 12 also has an axially extended and rearwardly opening recess 15 in which the plunger 16 is fitted, the rear end of this plunger being attached by conventional means 17 to the brake pedal arm B' so that, as the pedal is pressed forwardly, the plunger 16 will urge the primary piston 11 forwardly in the bore 9. At the head 18 of the piston 11 a pressure responsive sealing cup 19 is mounted and a diametrically reduced stop finger 20 is extended forwardly into the primary or rear pressure chamber or cylinder 21 in which the piston operates.

The forward or secondary piston 22 also comprises a head, 23, rearwardly extended diametrically reduced shank 24 and tail block 25. A rubber sealing ring 26 and rubber pressure ring or cup 27 are mounted at opposite sides of the block 25 to form an efficient seal with the adjacent chamber wall. The head 23 of the piston 22 carries another rubber pressure ring or cup 28. This piston operates in a frontal or secondary pressure chamber or cylinder 29, the end of which is sealed by a plug 30 having a rearwardly extended stop finger 31. An expansion coil spring 32 is braced between the piston 22 and the plug 30 and serves to normally urge the piston rearwardly in its chamber 29 and this movement is limited by the piston head 23 striking a shoulder 33 formed by enlarging the bore 9 so that the chamber 29 is of substantially greater diameter than the rear chamber 21. This relative enlargement of the frontal chamber 29 also has another function as will presently appear.

The rear piston 11 may be urged rearwardly to the normal position shown in Figure 1 by an expansion coil spring 34 braced between the head 18 and the rear of the frontal piston 22 and, in this case, the spring 32 must of necessity be somewhat stronger than this rear spring in order to return the frontal piston to its normal position against the tension of the rear spring and the frictional drag of the said frontal piston. However, by connecting the plunger 16 to the shank 12 of the rear piston, in some suitable manner as by the split washer 35 and the spring retainer ring 36, the usual return spring 37 of the brake pedal assembly may be used to restore the rear piston to initial position after each forward movement, and this arrangement would eliminate the necessity of springs such as 34. In this case the frontal spring 32 may be very light. It should be noted, however, that in any type of connection it is desirable to include some means that will prevent vibration of the brake pedal and other associated parts from being transmitted to the piston.

The supply tank portion 8 of the master cylinder is divided medially by a vertical partition wall 38 to provide a rear supply tank 39 from which the hydraulic fluid is fed into the rear chamber 21 through the small inlet port 40. The frontal tank 41 carries the fluid for the frontal chamber 29 and the feed is through the similar inlet port 42. Each tank 39 and 41 has its own splash-proof vented filler plug 43 of conventional form and which may be removed to refill the tanks.

The inlet ports 40 and 42 are located just forwardly of their associated piston heads 18 and 23, and their respective pressure seal cups, and consequently the arrangement is such that, as the pistons are moved forwardly, the fluid in the chambers 21 and 29 will be subject to pressure and will be prevented from feeding back into the tanks 39 and 41 by the sealing action of piston heads as they move across the inlet ports. The fluid thus put under pressure leaves the chambers 21 and 29 through the outlet ports 44 and 45, and through a system of lines or tubes is carried to the brakes as will presently appear.

It will be noted that these outlet ports 44 and 45 are so located that, at the extreme forward position of the pistons (occurring when the finger 20 contacts the cup 27 and the cup 28 contacts the finger 31), the piston heads will just clear the ports and will not seal the outlets at any time.

Located adjacent to, and rearwardly of, the inlet ports 40 and 42, are the back-pressure ports 46 and 47 which allow fluid from the tanks 39 and 41 to communicate with the bore 9 behind each piston head 18 and 23. The fluid behind each piston head may, as occasion demands, work through small orifices 48 in the heads and past the rings 19 and 28 in a well known manner. The building up of pressure in either tank 39 or 41 is prevented by the small splash port 49a at the upper extremity of the wall 38 and which port provides communication between the two tanks.

The fluid put under pressure by the master cylinder pistons 11 and 22 and emitted from the outlet ports 44 and 45 is carried out to the brakes through the main lines or tubes 49 and 50 respectively. These lines are connected by the usual plug fittings 51 to glands 52 which are screwed into outlets or nipples 53 formed on the body member 7 around the outlet ports. The fluid thus must flow through the two way valves 54 located in the outlets. These valves are of conventional form comprising the perforated outer housings 55 spring pressed against the sealing rings 56 and having the soft rubber linings 57. The action is such that the fluid under pressure may flow from the master cylinder by collapsing the linings 57, and may, if or as the pressure anywhere in the brake lines builds up sufficiently, unseat the housings 55 and flow back to the master cylinder. The purpose of these valves is thus to maintain a slight pressure in the lines at all times and prevent the formation of "pockets" due to seepage of liquid back to the master cylinder while at rest.

The application of the master cylinder, thus constructed, to a four wheel brake assembly is shown in Figure 2. In accordance with conventional practice a separate brake cylinder or brake operating cylinder is provided for each wheel and these are designated generally at 58, 59, 60 and 61 for the right front, left front, right rear and left rear wheels respectively. As shown in Figure 3 each of these cylinders has a pair of pistons 62 and 63 operating against slidable plugs 64 which have outwardly opening sockets 65. These plugs are of conventional form and, as shown in Figure 5, they engage the fingers C which are extended from the front and rear brake shoes D and E. Thus as the pistons 62a and 63a are urged apart, by hydraulic pressure in the cylinders, the brake shoes D and E will be urged outwardly on their pivots F to engage the interior of the brake drum G. Normally a retractile coil spring H stretched between the brake shoes pulls them out of engagement with the drum, and of course urges the pistons 62a and 63a inwardly. These pistons are spring set to maintain a slight outward force against the brake shoes by means of coil springs 66, as shown in Figure 3, or a single spring 66a, as shown in Figures 4 and 5, braced between the pistons but, of course, these springs are not heavy enough to overcome the tension of the springs H.

As employed in the assembly shown in Figure 2 the various brake cylinders are of novel form in that they are each divided by a central partition 67 into front and rear chambers 68 and 69 and the spring 66 is likewise divided into two sections and braced against the partition. Separate front and rear inlet ports 70 and 71 then lead into the front and rear chambers 68 and 69 and are provided with conventional line fittings 72 and 73 at their outer sides.

The cylinders 58 and 59 on the front wheels are connected by front and rear lines 74 and 75 which run between the front and rear chambers 68 and 69 of each cylinder as shown and the cylinders 60 and 61 are similarly connected together by front and rear lines 76 and 77. The front and rear wheel lines 74 and 76 are then connected by the main feeder line 78 to the frontal outlet line 50 of the master cylinder A while the rear lines 75 and 77 of both front and rear wheel brakes are connected by a feeder line 79 to the rear outlet line 49. The mechanical arrangement of the various lines on the chassis of the vehicle may be anything suitable but it will be noted that the assembly lends itself well to the present practice of mounting the feeder lines along one channel of the chassis frame and the connecting lines between front and rear brakes along the front and rear axles.

In operation, under normal conditions as the brake pedal B is pressed, the master cylinder pistons 11 and 22 move forwardly exerting a pressure on the fluid in the chambers 21 and 29 and this pressure is transmitted to the chambers 68 and 69 of all the brake cylinders through the lines as described. The pistons 62 and 63 in the brake cylinders thus move apart and force the brake shoes D and E into braking engagement with the brake drum G. It will be noted that the pressure in chamber 21 in the master cylinder A is transmitted only to the rear chambers 69 of the brake cylinders and that the pressure in the master cylinder chamber 29 is transmitted only to the frontal chambers 68. As a result should a leak occur in either circuit (that is, the front chamber 68 or rear chamber 69, and respective associated lines) then the other circuit would maintain its effectiveness and at least four of the brake shoes (one for each wheel) would be applied. The braking action thus provided, while less than normal, would nevertheless be sufficient to bring the vehicle to a stop. The brake applying pressures to all four wheels would always remain properly apportioned and skidding, "oversteer" and "understeer" would be prevented at all times since four wheel braking would be present even under emergency conditions.

As the brake shoes D and E are applied there is a well known tendency for the frontal shoe D to be thrown against the drum while the rear shoe E is thrown away from the drum. Unless steps are taken to prevent or counteract this action it will result in uneven wear on the shoes. Ordinarily the rear half of the brake cylinders is slightly enlarged in order to apply slightly greater pressure to the rear brake shoes and so compensate for the uneven force exerted on the brake shoes. However, in the case of my assembly as so far described, this is not necessary since the pressure per square inch in the chamber 21 of the master cylinder is greater than in the larger chamber 29 and this greater pressure is, by the connections shown, transmitted to the rear chambers 69 of the brake cylinders where it is needed.

Each brake cylinder and each chamber thereof is provided with an air relief means, as at 80, which may be opened to allow the brake system to be filled with fluid.

As shown in Figure 4 my improved master cylinder A may also be applied to conventional brake cylinders 81 of all four wheels of a vehicle. In this case the cylinders have the pistons 62a and 63a operating the caps 64a which engage the front and rear brake shoes D and E respectively. A single line 82 connects both front wheel brake cylinders to the frontal outlet line 50 of the master cylinder and a single line 83 connects both rear wheel brake cylinders to the rear outlet line 49 of the master cylinder. Thus as the master cylinder is operated both front and rear brakes will be applied in usual manner but, should a failure or leak occur in either front or rear brake assemblies, then the remaining brake assembly would still remain effective and would apply sufficient braking force to stop the vehicle. This, of course, would not be as effective a system as the one previously described using dual chambers in each brake cylinder, but it would serve at least for emergency use. This would be the arrangement resulting from the application of my master cylinder to the conventional hydraulic brake system to replace the single action master cylinder at present used.

In order to prevent uneven wear on the brake shoes the cylinders 81 may have their rear portions enlarged in conventional manner as indicated at 84.

It will be readily apparent that more than two separate circuits or sets of connected chambers and feed lines may be employed. Also that the assembly, particularly as shown in Figure 2, may be adapted for two wheel braking of tractors and similar vehicles.

The relative braking force applied to front and rear wheels may readily be varied by properly proportioning the diameters of the front and rear brake cylinders to the diameters of the chambers in the master cylinder to which they are connected.

The master cylinder A may also be employed to actuate separate or dual single acting brake cylinders 81a and 81b operating separate brake shoes D' and D" in a common or split brake drum G' as shown in Figure 6. In this case the separate lines from the master cylinder, indicated at 76a and 77a, are connected separately to the two brake cylinders as shown. Then in normal use both cylinders would operate to apply four brake shoes at each wheel and, should failure occur at any point, there would still remain the braking effect of at least one brake cylinder and two brake shoes at each wheel. Of course, the separate chambers 68 and 69 of each double acting brake cylinder are the equivalent of separate cylinders.

It is understood that I may vary from the specific details of construction and assembly as herein shown and described so as best to provide a practical assembly for the purposes in view, provided that such variations lie within the scope of the appended claims.

Having thus fully disclosed my invention what I claim as new and desire to secure by Letters Patent is:

1. A master cylinder assembly for actuating two separate pressure responsive hydraulic brake motor means, comprising a housing having an elongated bore with one portion thereof enlarged in diameter, separate and normally unconnected pistons movably mounted in portions of the bore which have different diameters and defining fluid chambers of different cross sectional areas therein, fluid carrying means for connecting one chamber and one motor means and for connecting the other chamber to the other motor means, and means responsive to movement of one piston in one direction for moving the other piston in the same direction only, the piston operating in the larger portion of the bore having an extension into the smaller portion of the bore.

2. A master cylinder assembly for actuating two separate pressure responsive hydraulic brake motor means, comprising a housing having an elongated bore with one portion thereof enlarged in diameter, separate and normally unconnected pistons movably mounted in portions of the bore which have different diameters and defining fluid chambers of different cross sectional areas therein, fluid carrying means for connecting the one chamber to one motor means and the other chamber to the other motor means, and means responsive to movement of one piston in one direction for moving the other piston in the same direction only, the piston operating in said larger portion of the bore having an extended tail block portion movable in fluid tight relation in said smaller portion of the bore and in spaced relation to the piston operating in said smaller portion.

3. A master cylinder assembly for actuating two separate pressure responsive hydraulic brake motor means, comprising a housing having an elongated bore with one portion thereof enlarged in diameter, separate and normally unconnected pistons movably mounted in portions of the bore which have different diameters and defining fluid chambers of different cross sectional areas therein, fluid carrying means for connecting one chamber to one motor means and the other chamber to the other motor means, the piston in said larger portion of the bore having an extended tail portion movable in fluid tight relation in the smaller portion having an extension for engaging said tail portion as the latter piston is urged in one direction in the bore.

LOUIS W. KRITZER.